United States Patent [11] 3,572,499

| | | | |
|---|---|---|---|
| [72] | Inventor | Ralph L. Mondano<br>Lexington, Mass. | |
| [21] | Appl. No. | 610,260 | |
| [22] | Filed | Jan. 19, 1967 | |
| [45] | Patented | Mar. 30, 1971 | |
| [73] | Assignee | Custom Materials, Inc.<br>Chelmsford, Mass. | |

[54] CONDUCTIVE PACKAGING MATERIAL AND CONTAINER FOR EXPLOSIVES
8 Claims, 3 Drawing Figs.

[52] U.S. Cl. ................................................. 206/1,
117/132, 117/161, 117/226, 156/306, 156/334,
161/38, 161/39, 161/88, 161/139, 161/145,
161/213, 161/214, 161/216, 161/218, 161/220,
174/35, 206/3, 229/3.5, 317/2

[51] Int. Cl. ......................................................... B32b27/32,
B32b 15/18, B32b 7/00

[50] Field of Search............................................ 161/213,
216, 249, 250, 220; 229/87 (M), 3.5 (MF); 206/3,
84; 102/28, 70.2; 117/16, 31; 117/132 (A), 226,
161; 156/306, 334; 161/214, 217, 218; 252/511;
206/1, 3; 174/35, 35.4; 317/2

[56] References Cited
UNITED STATES PATENTS

| | | | |
|---|---|---|---|
| 3,325,325 | 6/1967 | Ward............................ | 156/56 |
| 2,647,681 | 8/1953 | Paoli............................ | 229/3.5X |
| 2,658,451 | 11/1953 | Horne........................... | 102/28 |
| 2,817,604 | 12/1957 | Louis............................ | 117/16X |
| 3,057,539 | 10/1962 | Leary........................... | 229/86 |
| 3,078,201 | 2/1963 | Christie....................... | 161/146 |
| 3,085,025 | 4/1963 | Eaton........................... | 119/31 |
| 2,551,087 | 5/1951 | Barnhart et al.............. | 260/23 |
| 3,143,364 | 8/1964 | Klein........................... | 285/55 |
| 3,325,325 | 6/1967 | Ward............................ | 156/56 |

OTHER REFERENCES

Levy, W. W., " static Electricity," SPE Journal V. 18, N. 10, Oct. 1962 p 1288— 1290 Relied on.

McLaughlin, T. F., " How to measure and control static charges on plastic webs," Modern Plastics Feb. 1960 p.120,121,124 and 192 Relied on

*Primary Examiner*—John T. Goolkasian
*Assistant Examiner*—W. E. Hoag
*Attorney*—W. R. Hulbert

ABSTRACT: A laminated-sheet-packaging material having good moisture-vapor-barrier properties and providing reduced risk of deleterious effects from buildup of static electricity if formed from an aluminum film having a layer of protective material on one face and a layer of heat-sealable, electrically conductive plastic material on the other face, the electrically conductive plastic material forming the inner surface of the package.

Patented March 30, 1971   3,572,499

CONDUCTIVE PACKAGING MATERIAL AND CONTAINER FOR EXPLOSIVES

The present invention relates to packaging material in sheet form and more particularly to a composite laminated packaging material having improved electrical characteristics and good moisture-vapor-barrier properties, and to containers formed therefrom.

The invention provides an improved packaging material for the packaging of items which are sensitive both to moisture and to static electricity, such as devices utilizing static-spark-sensitive explosives, such as lead styphnate or lead azide, e.g., squibs, igniters, timers, fuses and cartridge-activated devices, containing such explosives. A material now used for the packaging of such items is made up of a film of aluminum foil with a sheet of Kraft paper on one side and a layer of nonconductive plastic material on the opposite side of the aluminum foil. While this material affords good moisture-vapor-barrier properties it is subject to the hazard of buildup of static charges. The art thus has known how to provide a packaging material having adequate moisture-vapor-barrier properties, but the use of such known materials in packaging static-sensitive items has resulted in the buildup of static charge with the danger of a static spark discharge and consequent accidental detonation.

An object of the invention is to provide a packaging material avoiding the foregoing difficulties, and packages formed therefrom.

A further object of the invention is to provide a packaging material having good moisture-vapor-barrier properties and improved electrical characteristics, and packages formed therefrom, suitable for use with explosive items sensitive to static electrical discharge.

In accordance with the invention the packaging material is a composite laminated material in sheet form comprising a layer of thin sheet metal, typically aluminum foil, a layer of protective material secured to one face of the metal layer, this protective material being adapted to form the outside of the package or container, and an exposed layer of an electrically conductive, synthetic organic polymeric plastic material, preferably heat sealable, and preferably electrically conductive, heat-sealable polyethylene, secured to said metal layer on its opposite face and adapted to ultimately form the interior surface of the package or container.

Figure 1:
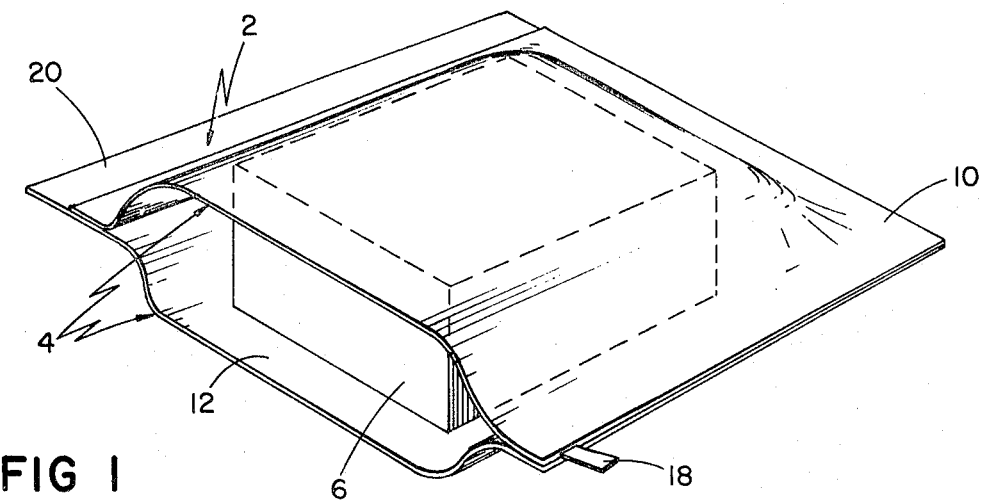
FIG. 1 is a perspective view of a package in accordance with the invention, left unsealed at one edge to reveal its contents.

Referring now to the drawing, FIG. 1 shows a package 2 formed from two sheets of a laminated packaging material 4 of the invention and containing a packaged item 6 of a character apt to be effected by a static spark discharge.

Figure 2:
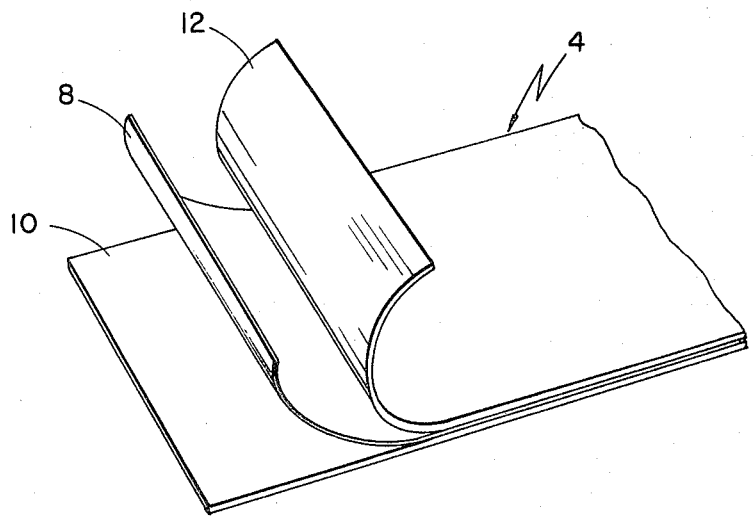
FIG. 2 is a perspective view of the packaging material employed in the wall of the package of FIG. 1, with the individual layers partly separated to better illustrate the construction.

The laminated packaging material 4 is shown in greater detail in FIG. 2. In FIG. 2, the laminated material 4 includes a layer 8 of aluminum foil which imparts to the material good moisture-vapor-barrier properties and other desirable characteristics. Secured to one face of the metal layer 8 is a layer of protective material 10 which is ultimately to form the outside of the package. The layer of protective material 10 may be any material suitable for protecting the metal layer 8 and giving good strength and body to the laminated material. Preferably, in accordance with one feature of the invention, the layer of protective material 10 is a layer of an electrically conductive synthetic organic polymeric plastic material, such as electrically conductive polyethylene. The layer of protective material 10 may comprise a Kraft or other paper or a woven, knitted or nonwoven fabric.

On the opposite face of the metal layer 8 is an exposed layer 12 of heat-sealable electrically conductive polyethylene. Such heat-sealable electrically conductive polyethylene is a known material and may be constituted of polyethylene having fine particles of carbon distributed therein. Due to its heat-sealable nature the polyethylene layer 12 may be secured to the aluminum foil 8 by application of heat and pressure. Polyethylene is a preferred material for this purpose because of its excellent heat sealing qualities. The polyethylene layer 12 constitutes an exposed layer of the laminated packaging material and is adapted to form the inside surface of the package, i.e., the surface which is in contact with the packaged item. It protects the metal layer 8 and the packaged item from damage by contact with each other. Other electrically conductive synthetic organic polymeric plastic materials, such as electrically conductive polyvinyl chloride or electrically conductive polyethylene terephthalate, may be used in place of electrically conductive polyethylene.

Figure 3:
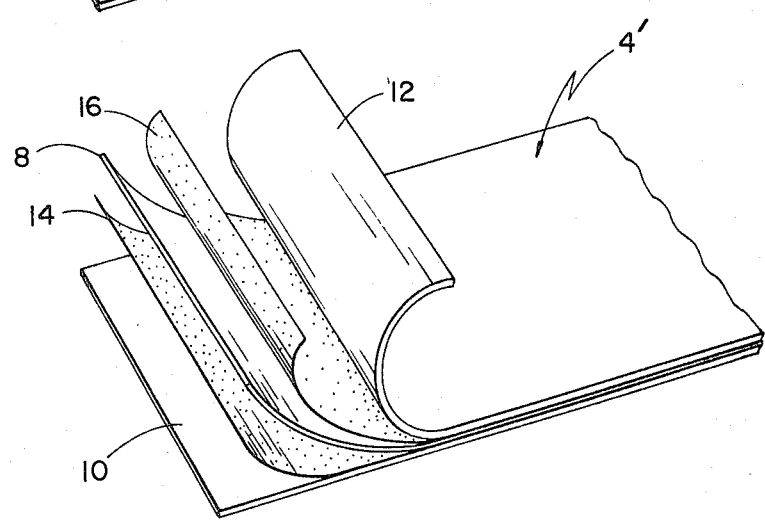
FIG. 3 is a perspective view of an alternative construction of the packaging material.

A modified packaging material in accordance with the invention is illustrated in FIG. 3. In this material, 4' the outer layer of protective material 10 is secured to the intermediate metal layer 8 by a separate adhesive layer 14, of any suitable adhesive material, electrically conductive or not, for example electrically conductive polyethylene. The layer 12 of electrically conductive plastic material is secured to the intermediate metal layer 8 by a separate adhesive layer 16, of any suitable adhesive material, electrically conductive or not, for example electrically conductive polyethylene.

The laminated material of the invention may be made electrically conductive throughout, by employing electrically conductive material for both layer 10 and layer 12, and when adhesive layers 14, 16 are employed, making them of conductive material.

It will be appreciated that features of the modification of FIG. 2 may be employed with the modification of FIG. 3, and vice versa. Thus, for example, one only of the layers 10 and 12 may be secured to the metal layer 8 by heat sealing, the other being secured by a separate layer of adhesive.

A layer of nonconductive plastic, e.g., polyethylene, may be present between the conductive inner layer 12 and the metal layer 8.

The composite laminated packaging material of the invention may be used as a wrapping material or it may be formed into packages, such as bags. Such packages may conveniently be formed, as in FIG. 1, by heat-sealing together two sheets of the packaging material along their marginal edges by application of heat and pressure, by any of the procedures well known in the art. Polyethylene, when employed as the inner layer, is readily so-sealed to provide a seal with excellent qualities.

When such bags are formed, a small face or area of the conductive material forming the inside surface may be left exposed so that by attaching a conventional alligator clip connected to a ground wire the operator can reliably ground out all static buildup inside the bag when it is to be opened and the contents removed. If desired one or both of the sheets forming a bag may be formed to provide an exposed tab, as at 18, of the inner layer of conductive material or one sheet may be arranged to extend beyond the other to expose the inner conductive material, as at 20, for convenient attachment of a grounding connection.

Where both inner and outer faces of the container are electrically conductive, they may in the package be connected together electrically, as by a simple metal connection. If there are intervening layers of nonconductive adhesive the metal layer 8 may be similarly connected to one or both of the inner and outer layers. Connection by an alligator clip to the free edge 20 conveniently makes a ground connection to both the inner and the outer layer, grounding out all static buildup if any is present.

It will be seen from the foregoing that the invention has provided an improved composite laminated packaging material in sheet form which has both good moisture-vapor-barrier properties and desirable electrical characteristics and which may conveniently be formed into packages by simple heat-sealing techniques to provide improved packages for items sensitive to static-spark discharge, affording reduced risk of accidental explosion. It will be appreciated that the laminated material of the invention is useful generally as a packaging material, for packaging many other items than those mentioned. For example, it may be used in packaging electronic components, or packaging light-sensitive items such as photographic film, the opacity of the layer of plastic loaded with carbon particles affording a good light barrier.

While particular embodiments of the invention have been described in detail for purposes of disclosure of the invention, it will be understood that the invention is not confined thereto but may include all variations and modifications thereof which fall within the scope of the following claims.

I claim:

1. A composite laminated packaging material for sealably packaging items which could be damaged by static electricity, said packaging material being in sheet form and comprising a continuous protective layer of thin sheet metal foil, a layer of sheet material secured to one face of said metal foil, which face would constitute the outer layer of a package, and a continuous layer of heat-sealable synthetic organic polymeric plastic material made electrically conductive by addition thereto of a nonmetallic filler adhered to said metal layer on its opposite face, a portion of said synthetic organic polymeric plastic material being adapted to be exposed when the packaging material is formed into a package for convenient attachment to a grounding connection.

2. A composite laminated packaging material as set forth in claim 1 wherein said layer of sheet material which is secured to said one face of said metal layer is also electrically conductive synthetic organic polymeric plastic material.

3. A composite laminated packaging material as set forth in claim 1 wherein said nonmetallic filler is carbon.

4. Plural sheet portions of a composite laminated material heat sealed and formed into a container for items which could be damaged by static electricity, said laminated material comprising a continuous protective layer of thin sheet metal foil, a layer of sheet material secured to the outer face of said metal foil, and a continuous layer of synthetic organic polymeric plastic material, made electrically conductive by the addition thereto of a nonmetallic filler, adhered to the inner face of said metal foil, the layers of plastic material of said sheet portions being disposed to define the inside surfaces of said container and being bonded together, and a portion of said synthetic organic polymeric plastic material extending beyond said container for convenient attachment to a grounding connection.

5. A container as set forth in claim 4 wherein said sheet material forming said outer face of said container is also electrically conductive synthetic organic polymeric plastic material.

6. A container as set forth in claim 4 wherein said nonmetallic filler is carbon.

7. Plural sheet portions of a composite laminated material heat sealed and formed into a container for items which could be damaged by static electricity, said laminated material comprising a continuous protective layer of thin sheet metal foil, a layer of sheet material secured to the outer face of said metal foil, and a continuous layer of synthetic organic polymeric plastic material, made electrically conductive by addition thereto of a nonmetallic filler, adhered to the inner face of said metal foil, the layers of plastic material of said sheet portions, being disposed to define the inside surfaces of said container and being bonded together and means electrically connected to said plastic material and extending outwardly from said container for convenient attachment to a grounding connection.

8. A composite laminated material as set forth in claim 7 wherein said nonmetallic filler is carbon.